United States Patent [19]

Cascini

[11] Patent Number: 4,512,697
[45] Date of Patent: Apr. 23, 1985

[54] TORQUE LIMITING FASTENER

[75] Inventor: Michael R. Cascini, Hudson, N.H.

[73] Assignee: Rockwell International Corporation, El Segundo, Calif.

[21] Appl. No.: 468,254

[22] Filed: Feb. 22, 1983

[51] Int. Cl.³ .............................................. F16B 31/02
[52] U.S. Cl. ........................................ 411/7; 411/911
[58] Field of Search ........................................ 411/1–8, 411/227, 393, 911, 10–12

[56] References Cited

U.S. PATENT DOCUMENTS

| 695,659 | 3/1902 | Snyder | 411/393 |
| 3,383,973 | 5/1968 | Gazal | 411/1 |
| 3,555,491 | 1/1971 | Moss | 411/7 |

FOREIGN PATENT DOCUMENTS 2030759  2/1971  Fed. Rep. of Germany .......... 411/6

Primary Examiner—Thomas J. Holko
Assistant Examiner—Neill Wilson
Attorney, Agent, or Firm—Robert C. Mayes; George A. Montanye; H. Frederick Hamann

[57] ABSTRACT

A fastener is disclosed having an integral limiting configuration which is adjustable to provide a variable maximum torque transmitted from a threaded bolt to the mechanism being fastened. The torque transmission is controlled at its maximum by a friction-bearing surface in cooperation with a spring. By predetermining and setting the compression exerted by the spring to the friction-bearing surface, the maximum torque transmitted is controlled.

3 Claims, 4 Drawing Figures

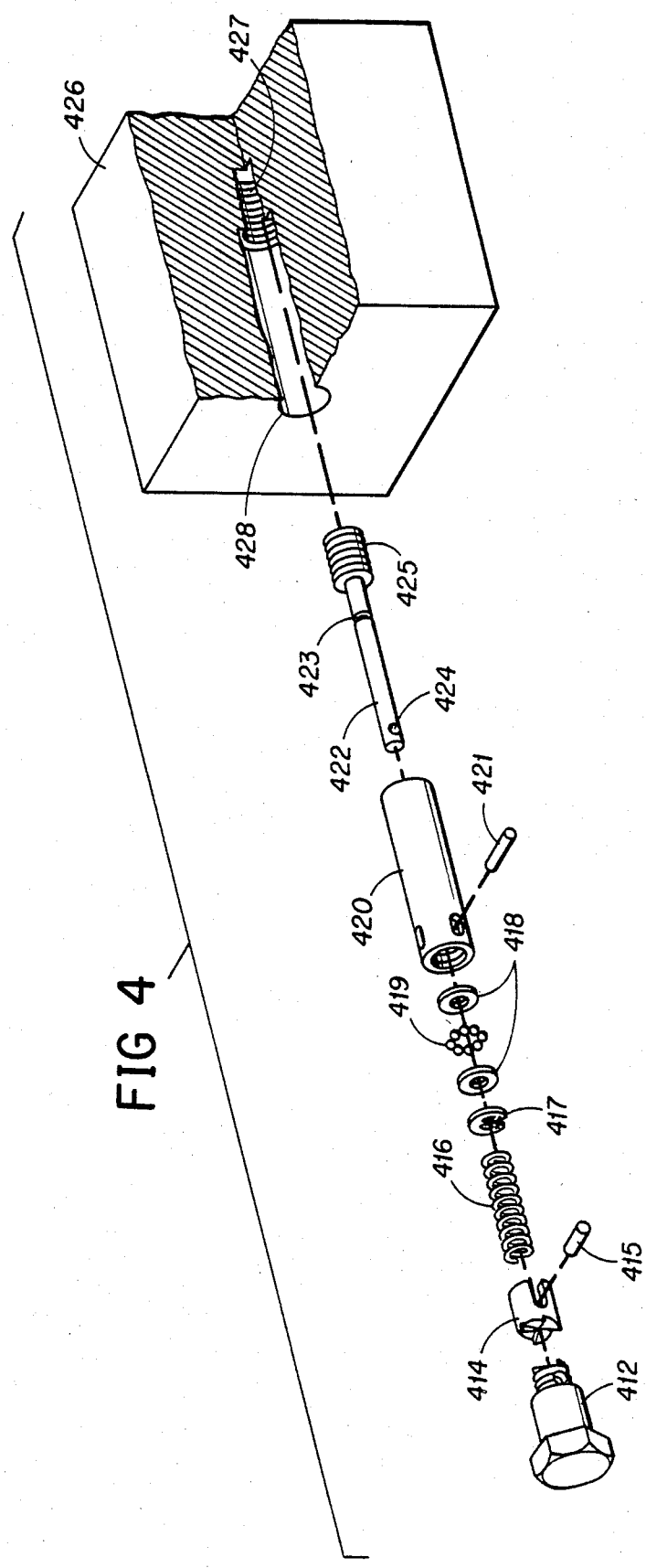

TORQUE LIMITING FASTENER

BACKGROUND OF THE INVENTION

This invention relates to mechanical fastening means in general, and in particular to torque limiting fasteners.

The use of controlled torque in fastening various assemblies has widespread use, particularly in applications having close tolerances, or in applications where the the control of the mating surfaces of the final assembly is critical to prevention of excessive stresses and maintenance of required specifications over the temperature ranges to which the final assembly is subjected.

In general, this torque control is accomplished with the use of a limited torque applying tool such as a torque wrench, which has the ability to input a preset torque into the wrench, or which has a torque gauge installed thereon for observing the torque during installation of the threaded fastener.

In some applications, however, the expense of a torque limiting tool, or the close working conditions under which the fastener is to be installed, do not permit the use of a torque wrench. Thus, the assembly being fastened may be subject to excessive torque and, therefore, damage.

Additionally, some applications require the repeated installation and removal of the fasteners under various and often unpredictable circumstances; a torque limiting tool may not always be available. These circumstances become critical when the fastener is utilized to install very expensive components, as for example avionics equipment costing thousands of dollars. If the fastener should be over-torqued, the resultant damage could convert a 20 minute instrument exchange into a situation requiring complete replacement of a very expensive instrument.

Alternatively, a race car driver may desire to quickly change the compression ratio of the engine in a race car, which requires a precise control of the torque holding the engine head to the block. Under the limited time restraints often experienced under race conditions, the procedures utilizing a torque wrench must be closely observed to prevent damage to the engine. An additional problem arises when various fasteners for the engine head have differing torque values; the mechanic must use either a plurality of preset torque wrenches or observe the indicator on a single torque wrench while inserting the plurality of fasteners with varying torque.

In the examples above, it can be seen that the risk of damage to expensive equipment through improperly controlling maximum torque can be a problem, and the risk is increased when limited time is allowed for the insertion of the fastener to be controlled, or where the fastener will be repeatedly inserted under essentially uncontrolled conditions.

SUMMARY AND BRIEF DESCRIPTION OF THE INVENTON

Accordingly, it is an object of the present invention to provide a torque limiting fastener having an internal torque limiting configuration.

Another object of the present invention is to provide a torque limiting fastener capable of controlling the maximum torque applied through it and thereby the compressive force applied to the fastened apparatus.

A yet further object of the present invention is to provide a torque limiting fastener having a variable maximum torque setting.

Briefly, and in accordance with the present invention, a torque limiting fastener comprises threaded means for holding a first apparatus, means for receiving the threaded means having a surface thereof orthogonal to the axis of rotation of the threads and the surface having a specified friction configuration, and means for engaging the surface cooperating with the means for receiving the threaded means and for rotatably coupling to a second apparatus. In this manner, a first apparatus is fastened to a second apparatus by threading the threaded means into the means for receiving while the specified friction configuration controls the maximum torque transmitted.

In a preferred embodiment, the specified friction configuration comprises a ratchet. The ratchet is mated to a corresponding ratchet and the rotational force of inserting the threaded means causes the mated ratchet members to ramp on the ratchet teeth as a function of a spring holding the mated ratchet members together.

The amount of force holding the mated ratchet members together is adjustable and thereby the maximum torque transmitted through the mated ratchet members may be adjusted or preset to a desired maximum.

FIG. 4 is an exploded view of an alternative embodiment of the present invention which is adapted for use as a torque limited bolt.

DETAILED DESCRIPTION OF THE DRAWINGS

Figure 1:
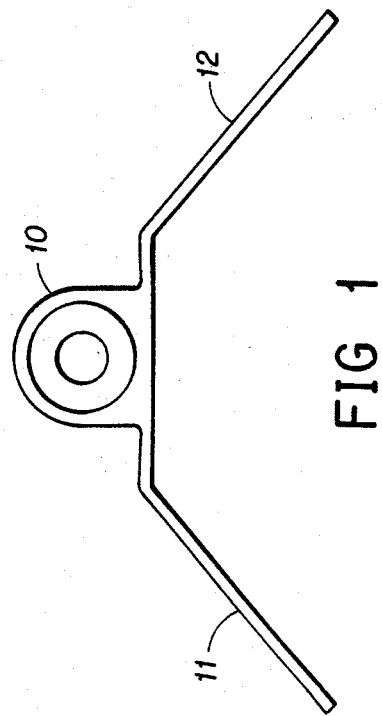
FIG. 1 is a frontal view of a portion of an avionics instrument clamp adapted for receiving the present invention.

Referring now to FIG. 1, a frontal view of an avionics instrument clamp is shown having the clamp attached wings 11 and 12 and the bolt receiving member 10 adapted for installation of the torque limiting fastener.

Figure 2:
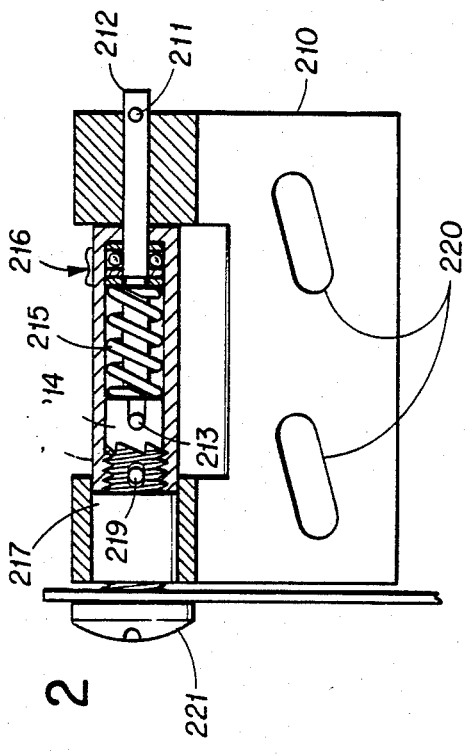
FIG. 2 is a cross-sectional view of the present invention installed in the portion of the avionics instrument clamp shown in FIG. 1.

In FIG. 2, the ramping slots 220 may be seen in side view where portion 210 of the clamp is wing 11 in FIG. 1.

Figure 3:
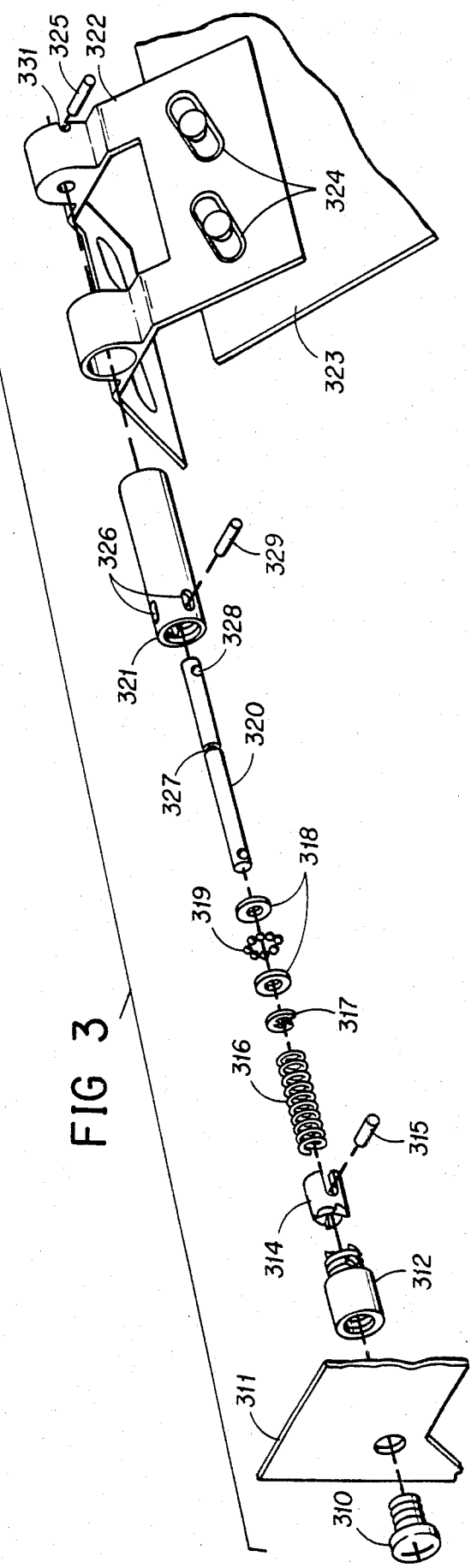
FIG. 3 is an exploded view of the present invention shown in combination with the instrument clamp of FIG. 1 and a cut-away portion of an instrument panel.

FIG. 3 shows the ramped slots 324 in conjunction with rivets and an additional portion of the instrument clamp 323 such that the tightening of fastener 310 through the cut-away portion of the instrument panel 311 relative to the clamp 322 causes an overall constriction in the internal measurements of the clamp, and thus the installed instrument (not shown) is held firmly. By over-torqueing a threaded screw, however, it is possible to clamp the instrument with such force that the instrument casing is permanently damaged and possibly causing interference with proper functioning of the clamped instrument.

By limiting the maximum torque capable of being applied through fastener 310 in FIG. 3, and thereby the compressive force between the instrument panel section 311 and the clamp portion 322, it is possible to limit the clamping force of the overall clamp configuration.

The exploded view in FIG. 3 shows one embodiment of the present invention with its components arranged for proper assembly.

The ratchet engaging member 314 is pinned with pin 315 to the rod 320. The ratchet engaging member 314 is slotted around pin 315 such that rotational movement between ratchet engaging member 314 and rod 320 is prevented; however, some lateral movement is allowed as a function of the compressive force applied by spring 316. The "E" ring 317 is clamped on rod 320 in the central clamp receiving slot 327 and provides a controlled position on rod 320 from which spring 316 provides a force on the ratchet engaging member 314. Ball bearings 319 are installed between the races 318 and around rod 320 which is then installed within the assembly housing 321. Pin 325 is pinned through the back receiving hole 328 of rod 320 for holding the rod 320, assembly housing 321, the bearings 319, races 318, and "E" ring 317 in a rotationally and laterally fixed position relative to the clamp 322. Rotational position is fixed by seating pin 325 into slot 331 of clamp 322.

As previously stated, the ratchet engaging member 314 is pinned to rod 320 by pin 315 in such a manner that it may move laterally within the housing 321 as a function of the depression of spring 316 between the ratchet engaging member 314 and "E" ring 317.

The threaded fastener receiver 312 is then installed by screwing its male threaded portion into the female threaded portion shown on the housing 321. When the proper compressive force between the ratchet engaging member 314 and the ratchet on the threaded fastener receiver 312 is reached, the threaded fastener receiver 312 is pinned through holes 326 by pin 329 to prevent further rotational movement between the threaded fastener receiver 312 and the assembly housing 321.

At this point, the assembly is essentially complete and ready for installation to the instrument panel 311. The threaded fastener 310 is inserted through instrument panel 311 and into the threaded fastener receiver 312 until the torque exerted through threaded fastener 310 is such that the compressive spring 316 can no longer maintain an engagement between the ramped surfaces of the ratchet engaging member 314 and the threaded fastener receiver 312 and at that point, the threaded fastener 310, the threaded fastener receiver 312, and the assembly housing 321 rotate with respect to the remaining portions of the assembly. The bearings 319 readily allow rotational motion between the threaded fastener receiver 312/assembly housing 321 combination, and the internal ratchet engaging member 314 and rod 320.

In the shown embodiment, the torque limited fastener is pinned to the clamp 322 for essentially permanent installation in the clamp. The compressive force applied between the clamp 322 and the instrument panel 311 is limited by the force exerted by pin 325 and by the force exerted on the front of the instrument panel 311 by the threaded fastener 310.

Referring now to FIG. 2, a completely assembled cross-sectional view of the present invention is shown where the threaded fastener receiver 217 is installed in the assembly housing 218 and pinned in place with pin 219. The ratchet engaging member 214 is shown engaged in the ratchet configuration on the threaded fastener receiver 217 and is prevented from rotating with respect to rod 212 by pin 213. The bearing, race, and internal "E" ring configuration 216 allows rotational movement between rod 212 and the assembly housing 218.

As the threaded fastener is tightened, the force exerted by the rotation of the fastener causes the threaded fastener receiver 217 to tend to ramp up the slopes of the ratchet engaging member 214 until the maximum torque has been exerted. At that point, the threaded fastener 221, the threaded fastener receiver 217, and the assembly housing 218 will rotate, without further tightening, around rod 212 and its associated parts. In FIG. 2, the conventional clockwise tightening motion of the threads can be seen to cause the ramping of the ratchet engaging member 214 relative to threaded fastener receiver 217 and thus limit the maximum permissible torque. However, a counterclockwise rotation of the screw will positively engage the ratchet teeth and allow the rapid removal of the threaded fastener. Pin 211 through rod 212 holds rod 212 relative to clamp 210 ensuring proper operation between the ratchet engaging member 214, the threaded fastener receiver 217 and the threaded fastener 221. The torque limitation is predetermined by selecting a spring length and strength in a specified range, and then inserting the threaded fastener receiver 217 into the assembly housing 218 until the proper compressive force is reached. At that time, the threaded fastener receiver 217 is pinned by insertion of pin 219 into the slots of assembly housing 218 to prevent further rotational movement between the assembly housing and the threaded fastener receiver. In this manner, the desired torque is preset prior to actual installation in the clamp.

Avionics instrument clamps utilizing the slots and riveted sections shown are known in the art; however, the commmon threaded screw which is normally utilized to provide the closure force around the case of the instrument, can and often does exert such a clamping pressure on the instrument that the case is damaged. Conversely, the use of the present invention prevents damage to the instrument in the following manner: the torque-limited fastener in the embodiment shown in FIGS. 2 and 3 is permanently installed in the clamp; and since the torque limit of the fastener is preset, the maximum compression force allowed by the fastener is also limited and therefore the maximum clamping pressure capable of being applied by the avionics instrument clamp is also limited. Additionally, since the fastener is permanently installed in the clamp, it cannot be lost and will always be in a proper position for immediate use as a torque limiting fastener. After installation in the clamp, no special tools, torque wrenches or otherwise are required to utilize the invention to its full benefit.

Referring now to FIG. 4, an alternative embodiment of the present invention is shown having a bolt configuration for installation in a cut-away view of a solid 426 as in, for example, an engine block. The internal configuration of the assembly is similar to that of FIG. 3 with the exception that the rod 422 has a threaded bolt configuration 425 for installation in threads 427 of block 426 and thereby the maximum torque between the bolt head member 412 and threads 425 on rod 422 is controlled by the use of the present invention.

It should be noted that the use of a ratchet configuration in the preferred embodiments shown herein is a desirable way of controlling the rotational friction between the ratchet engaging member 414 and the threaded receiving member 412 in one direction of rotation (clockwise) while firmly locking the two members together in the opposite rotational direction (counterclockwise). The bearings 419 together with bearing races 418 allow the ratchet engaging member 414 to transmit rotational force to the threads 425 until a level of torque is reached which overcomes the friction encountered between the ratchet engaging member 414 and the bolt head member 412 and the compressive force maintaining that frictional engagement presented by spring 416. When that torque limit has been reached, the ratchet engaging member 414 moves laterally around pin 415, compressing spring 416, and allows the rotation of the bolt head member 412 and the pinned assembly housing 420 around the ratchet engaging member 414, spring 416, and the rod 422. The torque applied to bolt 412 is transmitted through the assembled invention to threads 425 until the maximum permissible torque is attained. At that time, the bolt 412 rotates without further seating of threads 425 in block 426 and the purpose of the invention is attained. Upon bolt removal, the ratcheted face of the torque limiting mechanism allows easy removal by directly transmitting counterclockwise force to threads 425.

In actual operation, the preferred embodiment shown in FIG. 4 is preassembled and the torque is adjusted to a specified maximum torque level, and marked in such a manner that a mechanic can determine the maximum torque setting by visual examination. When the mechanic requires two different torque settings, he merely reaches for a bolt marked with the first setting, inserts and rotationally drives the bolt home until it is essentially spinning freely. Proceeding to the second fastener location, he then can insert a bolt in accordance with the present invention having a different torque setting as may be appropriate for the second location, and insert it in a similar manner. The torque limiting aspect of the present invention allows the compressive force between the joined members to be closely controlled with a minimum of time and training required. Upon removal, the ratchet configuration internal to the invention causes a positive locking between the torque input head and the threaded region of the invention and thus the torque limited fastener is quickly and easly removed.

Other applications of the preset torque-limiting fastener include test equipment having thermal gradients over which metal masses are required to maintain close tolerances, and thus a properly torqued fastener is paramount to prevent damage, and applications requiring a predetermined compressive force be applied. The present invention as shown in the embodiment in FIG. 4 may be inserted and removed repeatedly without affecting the torque-limiting action and after assembly requires nothing more than a common wrench to attain the full benefit of the present invention.

A common element to both of the embodiments shown in the accompanying drawings is the requirement for at least one region of threaded connection, either at the torque input end as shown in FIGS. 2 and 3, or at the fastening end as shown in FIG. 4. The cooperating ratchet engaging portion must be free to rotate with respect to the torque input means solely as a function of the frictional engagement of the ratchet teeth. Thus the avionics equipment installer and the automobile mechanic can perform their job utilizing the presently-invented torque-limiting fastener in a cost-saving and time-saving manner.

While the principles of this invention have been described in connection with specific examples, it is to be understood that this description is made only by way of example, and not as a limitation to the scope of the invention. Numerous other methods may be devised by those skilled in the art without departing from the spirit and scope of the appended claims.

I claim:

1. A fastener comprising in combination:
   a. a first assembly having a threaded region and an additional frictional region having a specified rotational friction characteristic;
   b. a second assembly rotatably coupled to said first assembly and having a fastening configuration in one region thereof and an additional region in a proximal cooperating relationship with said frictional region of said first assembly; and
   c. a threaded fastener for joining a first apparatus to a second apparatus wherein said fastening configuration of said second assembly is for connection to said second apparatus and is torque limited, preset, and including means for controllably joining said frictional region of said first assembly to said additional region of said second assembly, having a predetermined joining force and means for adjusting said predetermined joining force during assembly of said fastener, and means for preventing adjustment subsequent to assembly, said threaded fastener for connection to said first apparatus, and said first assembly for coupling said threaded fastener to said second assembly.

2. A fastener as in claim 1 wherein said specified rotational friction characteristic comprises a ratchet.

3. A fastener having an assembly housing comprising:
   a. means for inputting rotational force into said assembly housing variably coupled thereto, and having a region thereof formed in a ratchet configuration;
   b. a ratched engaging member mated on a first surface to said ratchet configured region of said means for inputting rotational force and said member additionally having a compressive force bearing surface on a side opposite said first surface;
   c. means for controlled mating of said ratchet engaging member to said means for inputting rotational force by providing a substantially fixed specified compressive force to said compressive force bearing surface of said ratchet engaging member, preset during assembly, including means for preventing adjustment subsequent to assembly, and thereby controlling the maximum torque transmitable in one rotational direction between said means for inputting and said ratchet engaging member; and
   d. a threaded fastener coupled to said ratchet engaging member.

* * * * *